United States Patent
Kenoyer et al.

(10) Patent No.: US 8,149,739 B2
(45) Date of Patent: Apr. 3, 2012

(54) BACKGROUND CALL VALIDATION

(75) Inventors: Michael L. Kenoyer, Austin, TX (US); Jonathan W. Tracey, Swavesey (GB)

(73) Assignee: LifeSize Communications, Inc., Austin, TX (US)

(*) Notice: Subject to any disclaimer, the term of this patent is extended or adjusted under 35 U.S.C. 154(b) by 1755 days.

(21) Appl. No.: 11/404,582

(22) Filed: Apr. 14, 2006

(65) Prior Publication Data

US 2006/0256738 A1 Nov. 16, 2006

Related U.S. Application Data

(63) Continuation-in-part of application No. 11/119,601, filed on May 2, 2005, now Pat. No. 7,864,714.

(60) Provisional application No. 60/619,210, filed on Oct. 15, 2004.

(51) Int. Cl.
*H04Q 11/00* (2006.01)
*H04N 7/14* (2006.01)
*H04M 3/42* (2006.01)

(52) U.S. Cl. ........ 370/260; 370/261; 370/262; 370/263; 348/14.08; 348/14.09; 379/202.01; 379/203.01; 379/204.01; 379/205.01

(58) Field of Classification Search .......... 370/237–238, 370/248, 260–262; 348/14.08–14.1
See application file for complete search history.

(56) References Cited

U.S. PATENT DOCUMENTS

| | | | | |
|---|---|---|---|---|
| 4,710,917 A | * | 12/1987 | Tompkins et al. | 709/204 |
| 4,847,829 A | * | 7/1989 | Tompkins et al. | 370/260 |
| 4,893,326 A | * | 1/1990 | Duran et al. | 348/14.12 |
| 5,077,732 A | | 12/1991 | Fischer et al. | |
| 5,276,681 A | | 1/1994 | Tobagi et al. | |
| 5,365,265 A | | 11/1994 | Shibata et al. | |
| 5,374,952 A | | 12/1994 | Flohr | |
| 5,381,413 A | | 1/1995 | Tobagi et al. | |
| 5,392,223 A | * | 2/1995 | Caci | 709/218 |
| 5,446,735 A | | 8/1995 | Tobagi et al. | |
| 5,491,797 A | * | 2/1996 | Thompson et al. | 709/204 |
| 5,506,832 A | * | 4/1996 | Arshi et al. | 348/14.09 |
| 5,530,472 A | * | 6/1996 | Bregman et al. | 348/14.09 |

(Continued)

FOREIGN PATENT DOCUMENTS

EP 1515515 A1 3/2005

(Continued)

OTHER PUBLICATIONS

"A history of video conferencing (VC) technology" http://web.archive.org/web/20030622161425/http://myhome.hanafos.com/~soonjp/vchx.html (web archive dated Jun. 22, 2003); 5 pages.

(Continued)

*Primary Examiner* — Patrick Edouard
*Assistant Examiner* — Huy C Ho
(74) *Attorney, Agent, or Firm* — Meyertons Hood Kivlin Kowert & Goetzel, P.C.

(57) ABSTRACT

A management system may test network paths prior to scheduled calls. Testing network paths may include one endpoint placing a test call to an endpoint on the other end of the path. Various characteristics of the network path may be tested. If the network path fails and/or in some way does not meet the predefined characteristics for the call, an administrator may be notified and/or alternate network path may be detected and tested. The call may be rescheduled if a satisfactory network path is not found in time.

20 Claims, 7 Drawing Sheets

U.S. PATENT DOCUMENTS

| | | | |
|---|---|---|---|
| 5,550,982 | A | 8/1996 | Long et al. |
| 5,568,183 | A | 10/1996 | Cortjens et al. |
| 5,572,583 | A | 11/1996 | Wheeler et al. |
| 5,592,477 | A | 1/1997 | Farris et al. |
| 5,617,539 | A | 4/1997 | Ludwig et al. |
| 5,642,156 | A | 6/1997 | Saiki |
| 5,657,096 | A | 8/1997 | Lukacs |
| 5,689,553 | A | 11/1997 | Ahuja et al. |
| 5,689,641 | A | 11/1997 | Ludwig et al. |
| 5,737,011 | A | 4/1998 | Lukacs |
| 5,751,338 | A | 5/1998 | Ludwig, Jr. |
| 5,764,277 | A | 6/1998 | Loui et al. |
| 5,859,979 | A | 1/1999 | Tung et al. |
| 5,867,495 | A | 2/1999 | Elliott et al. |
| 5,892,767 | A * | 4/1999 | Bell et al. ............... 370/432 |
| 5,896,128 | A | 4/1999 | Boyer |
| 5,903,302 | A | 5/1999 | Browning et al. |
| 5,914,940 | A | 6/1999 | Fukuoka et al. |
| 5,940,372 | A * | 8/1999 | Bertin et al. ............. 370/238 |
| 6,043,844 | A | 3/2000 | Bist et al. |
| 6,108,687 | A | 8/2000 | Craig |
| 6,147,988 | A | 11/2000 | Bartholomew et al. |
| 6,216,173 | B1 | 4/2001 | Jones et al. |
| 6,240,140 | B1 | 5/2001 | Lindbergh et al. |
| 6,262,978 | B1 | 7/2001 | Bruno et al. |
| 6,353,681 | B1 | 3/2002 | Nagai et al. |
| 6,357,028 | B1 | 3/2002 | Zhu |
| 6,477,248 | B1 | 11/2002 | Bruhnke et al. |
| 6,480,823 | B1 | 11/2002 | Zhao et al. |
| 6,590,604 | B1 * | 7/2003 | Tucker et al. ............. 348/14.13 |
| 6,594,688 | B2 | 7/2003 | Ludwig et al. |
| 6,621,515 | B2 | 9/2003 | Matthews et al. |
| 6,633,324 | B2 * | 10/2003 | Stephens, Jr. ............. 348/14.09 |
| 6,633,985 | B2 | 10/2003 | Drell |
| 6,674,457 | B1 | 1/2004 | Davies et al. |
| 6,693,661 | B1 | 2/2004 | Vanderwilt et al. |
| 6,704,769 | B1 | 3/2004 | Comstock et al. |
| 6,714,635 | B1 | 3/2004 | Adams et al. |
| 6,757,005 | B1 | 6/2004 | Elbaz et al. |
| 6,774,928 | B2 | 8/2004 | Bruzzone |
| 6,816,904 | B1 | 11/2004 | Ludwig et al. |
| 6,909,708 | B1 | 6/2005 | Krishnaswamy et al. |
| 6,975,721 | B1 | 12/2005 | Nimri et al. |
| 7,009,943 | B2 | 3/2006 | O'Neil |
| 7,016,341 | B2 | 3/2006 | Potter et al. |
| 7,043,749 | B1 | 5/2006 | Davies |
| 7,054,933 | B2 | 5/2006 | Baxley et al. |
| 7,081,827 | B2 | 7/2006 | Addy |
| 7,082,402 | B2 | 7/2006 | Conmy et al. |
| 7,174,365 | B1 | 2/2007 | Even |
| 7,437,463 | B1 * | 10/2008 | Valletutti et al. ............. 709/227 |
| 7,580,374 | B1 * | 8/2009 | Gilbert ............. 370/260 |
| 2002/0152440 | A1 | 10/2002 | Yona et al. |
| 2002/0159394 | A1 | 10/2002 | Decker et al. |
| 2002/0188731 | A1 | 12/2002 | Potekhin et al. |
| 2003/0058836 | A1 | 3/2003 | Even |
| 2003/0174146 | A1 | 9/2003 | Kenoyer |
| 2004/0028035 | A1 | 2/2004 | Read |
| 2004/0037268 | A1 | 2/2004 | Read |
| 2004/0042553 | A1 | 3/2004 | Elbaz et al. |
| 2004/0114612 | A1 | 6/2004 | Even et al. |
| 2004/0183897 | A1 | 9/2004 | Kenoyer et al. |
| 2005/0198134 | A1 | 9/2005 | Kenoyer et al. |
| 2005/0232151 | A1 * | 10/2005 | Chapweske et al. .......... 370/231 |
| 2006/0033809 | A1 * | 2/2006 | Farley ........................ 348/14.01 |
| 2006/0083182 | A1 | 4/2006 | Tracey |
| 2006/0106929 | A1 | 5/2006 | Kenoyer et al. |

FOREIGN PATENT DOCUMENTS

| | | |
|---|---|---|
| WO | 99/53719 | 10/1999 |

OTHER PUBLICATIONS

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; http://www.video.ja.net/intro/; 2001; 26 pages.

Louis C. Yun and David G. Messerschmitt; "Architectures for Multi-Source Multi-User Video Compositing"; 1993; 9 pages; University of California at Berkley, Berkley CA.

"Conferencing Service Provision—How Ridgeway IP Freedom Helps the CSP"; 2002; 4 pages; Ridgeway Systems and Software Ltd.

"Deploying H.323 Conferencing on Your IP Network—Seeing, Hearing, and Sharing Across Networks"; First Virtual Communications Technical White Paper; 2000; 11 pages.

"Eye-to-Eye Video"; Retrieved from the Internet: http://itotd.com/articles/254/eye-to-eye-video/; Jul. 23, 2004; 6 pages.

"H.264 FAQ"; Retrieved from the Internet: http://www.apple.com/mpeg4/h264faq.html; 2005; 2 pages.

"IPfreedom—Enabling end-to-end IP Voice (VoIP) and Video communications by securely traversing firewalls and NATs"; Glowpoint Case Study; 2003; 4 pages; Ridgeway Systems & Software, Inc.

Victor Paulsamy and Samir Chatterjee; "Network Convergence and the NAT/Firewall Problems"; Proceedings of the 36th Hawaii International Conference on System Sciences; Jan. 2003; 10 pages.

"Personal videoconferencing from the desktop is better than ever" http://web.archive.org/web/20041009174345/www.wireone.com/products_desktop.php (web archive dated Oct. 9, 2004) (Copyright 2003); 2 pages.

"Radvision Firewall Cookbook"; Manual; Jan. 2002; 26 pages; Radvision.

Ira M. Weinstein; "Security for Videoconferencing: A guide to understanding, planning, and implementing secure compliant ISDN & IP videoconferencing solutions"; Jan.-Feb. 2004; 16 pages; Wainhouse Research.

"Traversing Firewalls and NATs With Voice and Video Over IP"; Whitepaper; Apr. 2002; 14 pages; Wainhouse Research, LLC & Ridgeway Systems and Software, Inc.

"Traversing Firewalls with Video over IP: Issues and Solutions" VCON Visual Communications, Whitepaper, Aug. 2003; 8 pages.

"V-Span" (http://web.archive.org/web/20040806213948/www.vspan.com/html/managedservices/vbm/index.html) (web archive dated Aug. 6, 2004); 2 pages.

E. J. Addeo, A. D. Gelman and A. B. Dayao; "A Multi-media Multi-point Communication Services Capability for Broadband Networks"; Mar. 1987; pp. 423-428; Bell Communications Research; Morristown, NJ.

E. J. Addeo, A.D. Gelman and A.B. Dayao; "Personal Multi-media Multi-point Communication Services for Broadband Networks", Global Telecommunications Conference and Exhibition; Nov.-Dec. 1988 pp. 53-57; vol. 1.

Elan Amir, Steven McCanne and Randy Katz; "Receiver-driven Bandwidth Adaptation for Light-weight Sessions"; Proceedings of the fifth ACM international conference on Multimedia; 1997; pp. 415-426; Berkeley, CA.

"Procedures for establishing communication between three or more audiovisual terminals using digital channels up to 1920 kbit/s" ITU-T H.243 (Feb. 2000); International Telecommunication Union; 62 pages; Geneva, Switzerland.

"Multipoint control units for audiovisual systems using digital channels up to 1920 kbit/s"; ITU-T H.231 (Jul. 1997) International Telecommunication Union; 21 pages.

"Polycom Executive Collection"; Jun. 2003; 4 pages; Polycom, Inc.; Pleasanton, CA.

E. F Brown, J. O. Limb and B. Prasada; "A Continuous Presence Video Conferencing System"; National Telecommunications Conference Record; Dec. 1978; 5 pages; vol. 1.

Armando Fox, Steven D. Gribble, Eric A. Brewer, and Elan Amir; "Adapting to Network and Client Variability via On-Demand Dynamic Distillation" Proceedings of the seventh international conference on Architectural support for programming languages and operating systems;1996; pp. 160-170.

P. Galvez, H. Newman, C. Isnard and G. Denis; "Networking, Videoconferencing and Collaborative Environments"; Computer Physics Communications; May 1998; pp. 43-50; vol. 110, Issue 1-3.

Tohru Hoshi, Kenjiro Mori, Yasuhiro Takahashi Yoshiyuki Nakayama, and Takeshi Ishizaki; "B-ISDN Multimedia Communication and Collaboration Platform Using Advanced Video Workstations to Support Cooperative Work"; IEEE Journal on Selected Areas in Communications; Dec. 1992; pp. 1403-1412; vol. 10, No. 9.

A.B. Larsen and E.F. Brown; "'Continuous Presence' Video Conferencing at 1.5-6 Mb/sec"; Teleconferencing and Interactive Media, University of Wisconsin Extension Center for Interactive Programs; 1980; 8 pages.

Aurel Lazar, Koon-Seng Lim and Franco Marconcini; "Realizing a Foundation for Programmability of ATM Networks with the Binding Architecture"; IEEE Journal on Selected Areas in Communications; Sep. 1996; pp. 1214-1227; vol. 14, No. 7.

Aurel A. Lazar, Koon-Seng Lim and Franco Marconcini; "xbind: The System Programmer's Manual"; Technical Report; Jun. 1996; 69 pages; Center for Telecommunications Research; Columbia University, New York.

Michael E. Lukacs; "The Personal Presence System—Hardware Architecture", Proceedings of the Second ACM International Conference on Multimedia; Oct. 1994; pp. 69-76; Bell Communications Research.

Shigeki Masaki, Hiroyuki Yamaguchi, Yasuhito Hayashi, Takashi Nishimura, and Kazunori Shimamura; "Multimedia Handling Scheme in a Groupware System for B-ISDN"; IEEE Global Telecommunications Conference; Dec. 1992; pp. 747-751; NTT Human Interface Labs.

Shigeki Masaki, Hiroyuki Yamaguchi Hideya Ichihara and Kazunori Shimamura; "A Desktop Teleconferencing Terminal Based on B-ISDN: PMTC"; NTT Review; Jul. 1992; pp. 81-85; vol. 4, No. 4.

Steven McCanne; "Scalable Multimedia Communication with Internet Multicast, Light-weight Sessions, and the Mbone"; 1998; 32 pages; University of California Berkeley.

Leysia Palen; "Social, Individual and Technological Issues for Groupware Calendar Systems" Conference on Human Factors in Computing Systems; 1999; pp. 17-24.

Roderick E. Perkins; "Spider: Investigation in Collaborative Technologies and Their Effects on Network Performance"; Global Telecommunications Conference; Dec. 1991; pp. 2074-2080; vol. 3.

Wilko Reinhardt; "Advance Reservation of Network Resources for Multimedia Applications"; Proceedings of the Second International Workshop on Multimedia: Advanced Teleservices and High-Speed Communication Architectures; 1994; pp. 23-33.

Shaker Sabri and Birendra Prasada; "Video Conferencing Systems"; Proceedings of the IEEE; Apr. 1985; pp. 671-688; vol. 74, Issue 4.

Marc H. Willebeek-Lemair and Zon-Yin Shae; "Videoconferencing over Packet-Based Networks" IEEE Journal on Selected Ares in Communications; Aug. 1997; 1101-1114; vol. 15, No. 6.

"How Glowpoint Works", http://web.archive.org/web/20031008073034/www.glowpoint.com/pages/about/how.html, web archive dated Oct. 8, 2003; 1 page.

Aurel A. Lazar and Koon-Seng Lim; "Programmability and Service Creation for Multimedia Networks"; Fifth IEEE International Symposium on High Performance Distributed Computing; 1996; pp. 217-223.

Elan Amir, Steven McCanne, and Hui Zhang; "An Application Level Video Gateway"; in Proceedings of ACM Multimedia '95; 1995; 18 ppages.

"Tunnel: A simple UDP/TCP tunnel application"; www.tunnel.mrq3.com from web archive: http://web.archive.org/ web/20040901071149/http://tunnel.mrq3.com/, dated 2004; 2 pages.

Apple Computer, Inc. "Apple 'Open Sources' Rendevous," Press Release, Sep. 25, 2002, Cupertino, California, Apple.com.

Stephan Somogyi, "Apple's Rendezvous: What it is and why it matters," Article, Aug. 28, 2002, CNET Networks, Inc., online at http://review.zdnet.com14520-6033_16-4207554.html.

U.S. Appl. No. 11/858,342, entitled "Videoconferencing System Discovery", by Matthew K. Brandt, filed on Sep. 20, 2007.

* cited by examiner

BACKGROUND CALL VALIDATION

PRIORITY

This application claims priority to U.S. Provisional Patent Application Ser. No. 60/676,918 titled "Audio and Video Conferencing", which was filed May 2, 2005, whose inventors are Michael L. Kenoyer, Wayne Mock, and Patrick D. Vanderwilt which is hereby incorporated by reference in its entirety as though fully and completely set forth herein.

This application is further a continuation-in-part of U.S. patent application titled "Capability Management for Automatic Dialing of Video and Audio Point to Point/Multipoint or Cascaded Multipoint Calls", Ser. No. 11/119,601, which was filed May 2, 2005 now U.S. Pat. No. 7,864,714, whose inventor is Jonathan W. Tracey (which claims benefit of priority to provisional application Ser. No. 60/619,210 titled "Video Conference Call System," filed on Oct. 15, 2004, whose inventors are Jonathan W. Tracey, Craig B. Malloy, Michael L. Kenoyer, Michael V. Jenkins, Ashish Goyal, and Michael J. Burkett) which is hereby incorporated by reference in its entirety as though fully and completely set forth herein.

BACKGROUND OF THE INVENTION

1. Field of the Invention

The present invention relates generally to networking and, more specifically, to network validation.

2. Description of the Related Art

Video conferencing may be used to allow two or more participants at remote locations to communicate using both video and audio. Each participant location may include a video conferencing system for video/audio communication with other participants. Each video conferencing system may include a camera and microphone to collect video and audio from a first or local participant to send over a network to another (remote) participant. Each video conferencing system may also include a display and speaker to reproduce video and audio received over the network from a remote participant. Each video conferencing system may also be coupled to a computer system to allow additional functionality into the videoconference. For example, additional functionality may include data conferencing (including displaying and/or modifying a document for both participants during the conference). Because of various network conditions, network paths between video conferencing systems may suffer failure or performance degradation. This can be a costly problem, especially if a room full of executives cannot join an important board meeting videoconference because of a previously undetected network condition.

SUMMARY OF THE INVENTION

In various embodiments, a management system or an endpoint (e.g., an audio device, a video conferencing endpoint, and/or teleconferencing devices such as cell phones) may be operable to perform call connectivity/validation. For example, a videoconference system may operate to periodically make a call or otherwise establish connectivity with various remote locations to ensure that the videoconference system is operational and ready for use. This operation is intended to reduce or eliminate situations where a plurality of participants gather at various locations to participate in a conference call, and one or more of the systems encounter problems establishing connectivity.

In some embodiments, the management system/videoconference system may maintain a schedule of videoconference calls, comprising information regarding the call information of the call, the time of the call, etc. One or more of the videoconference systems involved in this scheduled call, or each videoconference system involved in this scheduled call, may operate to perform videoconference call connectivity/validation at a preset time (or a plurality of preset times) before the beginning of the scheduled call, to ensure that the videoconference can be set up and performed smoothly. For example, each of the videoconference systems involved in the call may perform call connectivity/validation 2 hours before a call (to allow time to troubleshoot any problems if necessary) and may also perform call connectivity/validation 30 minutes before the call or at any set interval or intervals before the call is due to launch.

If one or more of the videoconference systems encounters difficulty, then the respective system may automatically send an alert to an information technology (IT) person to troubleshoot the problem by a variety of methods dependant on connectivity of the videoconference system. The videoconference system may also automatically alert one or more of the participants in the call, to allow the participants to attempt to troubleshoot or make other arrangements. Alternatively, or in addition, the respective videoconference system, either when the problem is detected, or if the problem has not been resolved within a time frame of the call, may automatically re-schedule the videoconference to a later time or change the booking arrangements to use videoconferencing endpoints that are available and functioning correctly. The system may further update participants of the change in plans for the conference (e.g., by sending out email alerts to each of the participants regarding the schedule change).

BRIEF DESCRIPTION OF THE DRAWINGS

A better understanding of the present invention may be obtained when the following detailed description is considered in conjunction with the following drawings, in which.

Figure 1:
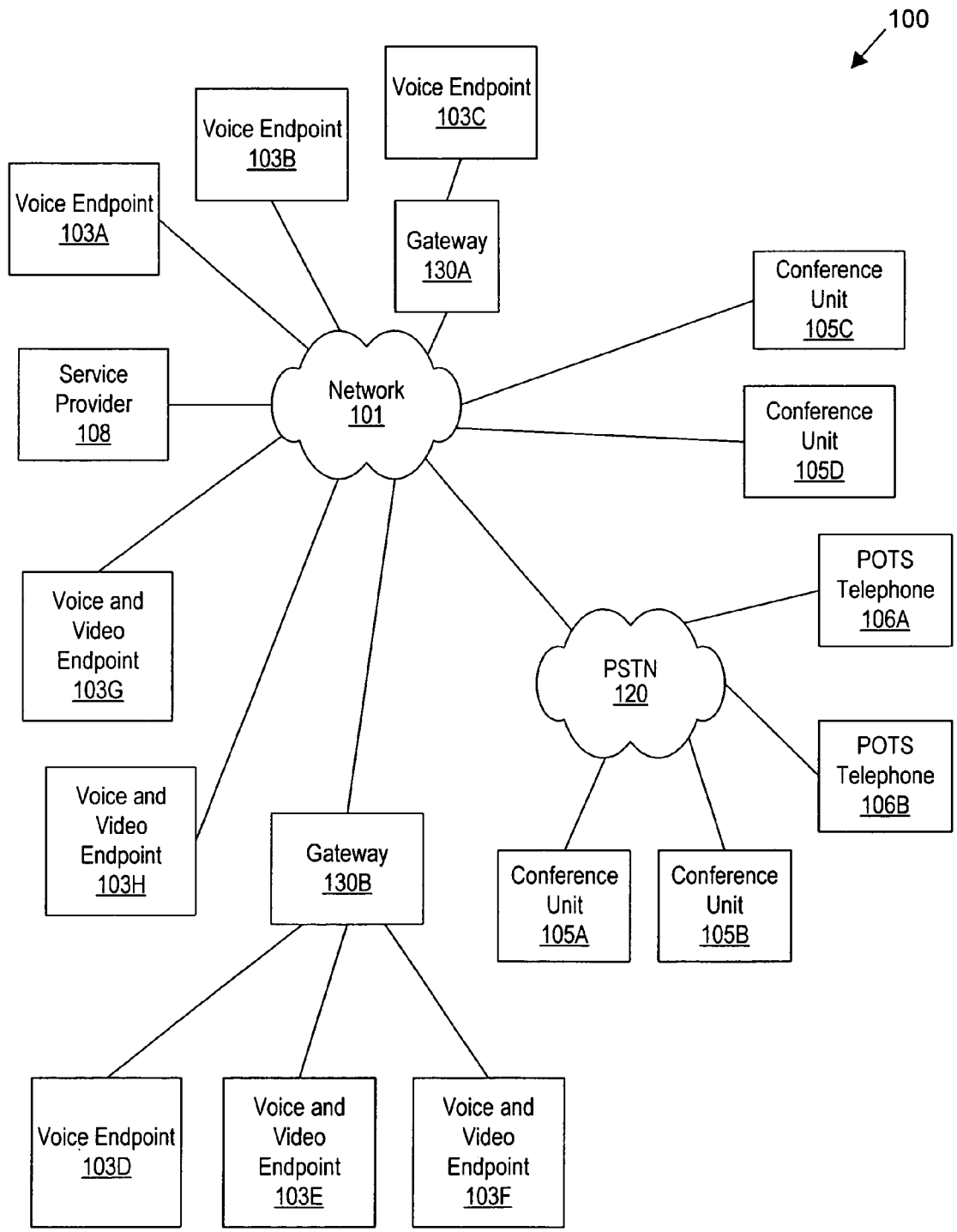
FIG. 1 illustrates a videoconferencing system, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. patent application titled "Speakerphone", Ser. No. 11/251,084, which was filed Oct. 14, 2005, whose inventor is William V. Oxford is hereby incorporated by reference in its entirety as though fully and completely set forth herein.

U.S. patent application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. patent application titled "Speakerphone Supporting Video and Audio Features", Ser. No. 11/251,086, which was filed Oct. 14, 2005, whose inventors are Michael L. Kenoyer, Craig B. Malloy and Wayne E. Mock is hereby incorporated by reference in its entirety as though fully and completely set forth herein.

U.S. patent application titled "High Definition Camera Pan Tilt Mechanism", Ser. No. 11/251,083, which was filed Oct. 14, 2005, whose inventors are Michael L. Kenoyer, William V. Oxford, Patrick D. Vanderwilt, Hans-Christoph Haenlein, Branko Lukic and Jonathan I. Kaplan, is hereby incorporated by reference in its entirety as though fully and completely set forth herein.

FIG. 1 illustrates an embodiment of a videoconferencing system 100. Video conferencing system 100 comprises a plurality of participant locations or endpoints. FIG. 1 illustrates an exemplary embodiment of a videoconferencing system 100 which may include a network 101, endpoints 103A-103H (e.g., audio and/or video conferencing systems), gateways 130A-130B, a service provider 108 (e.g., a multipoint control unit (MCU)), a public switched telephone network (PSTN) 120, conference units 105A-105D, and plain old telephone system (POTS) telephones 106A-106B. Endpoints 103C and 103D-103H may be coupled to network 101 via gateways 130A and 130B, respectively, and gateways 130A and 130B may each include firewall, network address translation (NAT), packet filter, and/or proxy mechanisms, among others. Conference units 105A-105B and POTS telephones 106A-106B may be coupled to network 101 via PSTN 120. In some embodiments, conference units 105A-105B may each be coupled to PSTN 120 via an Integrated Services Digital Network (ISDN) connection, and each may include and/or implement H.320 capabilities. In various, embodiments, video and audio conferencing may be implemented over various types of networked devices.

In some embodiments, endpoints 103A-103H, gateways 130A-130B, conference units 105C-105D, and service provider 108 may each include various wireless or wired communication devices that implement various types of communication, such as wired Ethernet, wireless Ethernet (e.g., IEEE 802.11), IEEE 802.16, paging logic, RF (radio frequency) communication logic, a modem, a digital subscriber line (DSL) device, a cable (television) modem, an ISDN device, an ATM (asynchronous transfer mode) device, a satellite transceiver device, a parallel or serial port bus interface, and/or other type of communication device or method.

In various embodiments, the methods and/or systems described may be used to implement connectivity between or among two or more participant locations or endpoints, each having voice and/or video devices (e.g., endpoints 103A-103H, conference units 105A-105D, POTS telephones 106A-106B, etc.) that communicate through various networks (e.g., network 101, PSTN 120, the Internet, etc.).

In some embodiments, endpoints 103A-103C may include voice conferencing capabilities and include or be coupled to various audio devices (e.g., microphones, audio input devices, speakers, audio output devices, telephones, speaker telephones, etc.). Endpoints 103D-103H may include voice and video communications capabilities (e.g., video conferencing capabilities) and include or be coupled to various audio devices (e.g., microphones, audio input devices, speakers, audio output devices, telephones, speaker telephones, etc.) and include or be coupled to various video devices (e.g., monitors, projectors, displays, televisions, video output devices, video input devices, cameras, etc.). In some embodiments, endpoints 103A-103H may comprise various ports for coupling to one or more devices (e.g., audio devices, video devices, etc.) and/or to one or more networks.

In some embodiments, conference units 105A-105D may include voice and/or video conferencing capabilities and include or be coupled to various audio devices (e.g., microphones, audio input devices, speakers, audio output devices, telephones, speaker telephones, etc.) and/or include or be coupled to various video devices (e.g., monitors, projectors, displays, televisions, video output devices, video input devices, cameras, etc.). In some embodiments, endpoints 103A-103H and/or conference units 105A-105D may include and/or implement various network media communication capabilities. For example, endpoints 103A-103H and/or conference units 105C-105D may each include and/or implement one or more real time protocols, e.g., session initiation protocol (SIP), H.261, H.263, H.264, H.323, among others. In the currently preferred embodiment, endpoints 103A-103H implement H.264 encoding for high definition (HD) video streams.

In various embodiments, a codec may implement a real time transmission protocol. In some embodiments, a codec (which may mean short for "compressor/decompressor") may comprise any system and/or method for encoding and/or decoding (e.g., compressing and decompressing) data (e.g., audio and/or video data). For example, communication applications may use codecs to convert an analog signal to a digital signal for transmitting over various digital networks (e.g., network 101, PSTN 120, the Internet, etc.) and to convert a received digital signal to an analog signal. In various embodiments, codecs may be implemented in software, hardware, or a combination of both. Some codecs for computer video and/or audio may include MPEG, Indeo™, and Cinepak™, among others.

At least one of the participant locations includes a camera for acquiring high resolution or HD (e.g., HDTV compatible) signals, as discussed further below. At least one of the participant locations includes an HD display (e.g., an HDTV display), for displaying received video signals in an HD format, as discussed further below. In one embodiment the network 101 may be 1.5 MB or less (e.g., T1 or less). In another embodiment, the network is 2 MB or less.

In some embodiments, a video conferencing system may be designed to operate with network infrastructures that support T1 capabilities or less, e.g., 1.5 mega-bits per second or less in one embodiment, and 2 mega-bits per second in other embodiments. The video conferencing system supports HD capabilities. The term "high resolution" includes displays with resolution of 1280×720 pixels and higher. In one embodiment, high-definition resolution may comprise 1280×

720 progressive scans at 60 frames per second, or 1920×1080 interlaced or 1920×1080 progressive. Thus, an embodiment of the present invention comprises a video conferencing system with HD "e.g. similar to HDTV" display capabilities using network infrastructures with bandwidths T1 capability or less. The term "high-definition" is intended to have the full breath of its ordinary meaning and includes "high resolution".

Figure 2:
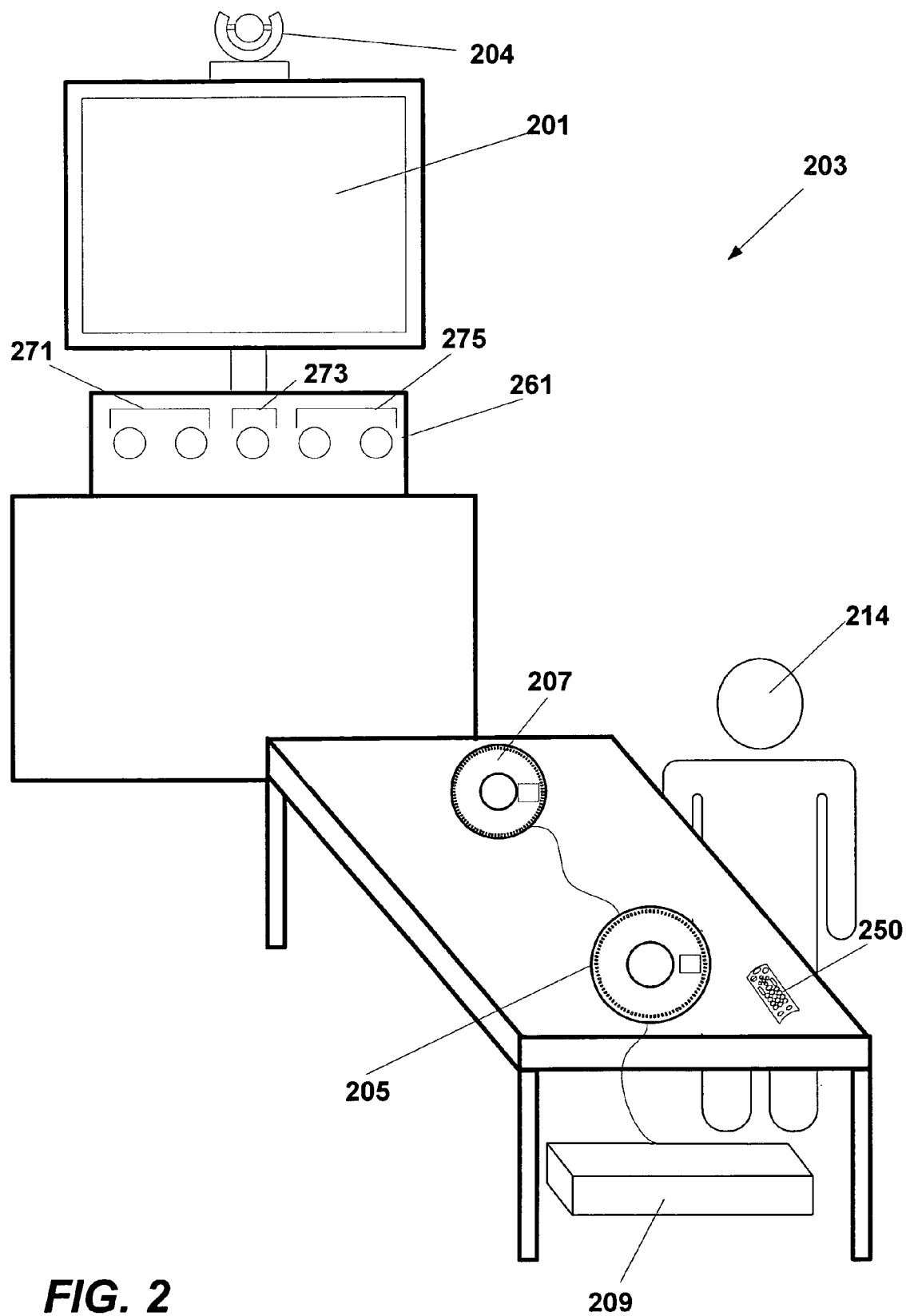
FIG. 2 illustrates a video conferencing system participant location, according to an embodiment.

FIG. 2 illustrates an embodiment of a participant location, also referred to as an endpoint or conferencing unit (e.g., a video conferencing system). The videoconference system may have a system codec 209 to manage both a speakerphone 205/207 and a video conferencing system 203. For example, a speakerphone 205/207 and a video conferencing system 203 may be coupled to the integrated video and audio conferencing system 209 and may receive audio and/or video signals from the system codec 209.

In some embodiments, the participant location may include an HD camera 204 for acquiring HD images (e.g., of participant 214) of the participant location. The participant location may also include an HD display 201 (e.g., a HDTV display). HD images acquired by the camera may be displayed locally on the display and may also be encoded and transmitted to other participant locations in the videoconference.

The participant location may also include a sound system 261. The sound system 261 may include multiple speakers including left speakers 271, center speaker 273, and right speakers 275. Other numbers of speakers and other speaker configurations may also be used. The video conferencing system may include a camera 204 for capturing video of the conference site. The video conferencing system may include one or more speakerphones 205/207 which may be daisy chained together.

In some embodiments, the video conferencing system components (e.g., the camera 204, display 201, sound system 261, and speakerphones 205/207) may be coupled to a system codec 209. The system codec 209 may be placed on a desk or on a floor. Other placements are also contemplated. The system codec 209 may receive audio and/or video data from a network. The system codec 209 may send the audio to the speakerphone 205/207 and/or sound system 261 and the video to the display 201. The received video may be HD video that is displayed on the HD display. The system codec 209 may also receive video data from the camera 204 and audio data from the speakerphones 205/207 and transmit the video and/or audio data over the network to another conferencing system. The conferencing system may be controlled by a participant through the user input components (e.g., buttons) on the speakerphone and/or remote control 250. Other system interfaces may also be used.

Figure 3:
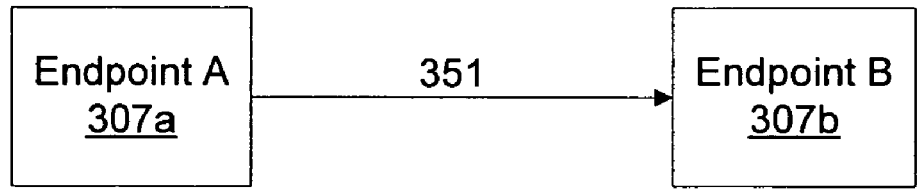
FIG. 3 illustrates two endpoints verifying a network path, according to an embodiment.

FIG. 3 illustrates an embodiment of verifying a network path between two endpoints. An endpoint may be any network device (e.g., an audio device, a video conferencing endpoint, and/or teleconferencing devices such as cell phones). A future call (e.g., an audio and/or video call) may be scheduled between endpoint A 307a and endpoint B 307b. Prior to the call, a network path 351 (e.g., a communications path) between endpoint A 307a and endpoint B 307b may be verified (e.g., tested to determine if the path is functioning according to predefined parameters) to determine if the network path 351 is prepared for the scheduled call. For example, endpoint A 307a may test call endpoint B 307b using protocols necessary to conduct a call. As used herein, protocols may include rules describing how to transmit data across a network (e.g., what bandwidth to use). Other methods of verifying the network path besides a test call are also contemplated. Testing may be conducted and/or scheduled by the endpoints and/or a management system coupled to the endpoints. In some embodiments, the test calls may be made automatically by the endpoint and/or management system without user intervention.

In some embodiments, when endpoint B 307b receives the test call, it may send a verification (e.g., a positive status indicator) to endpoint A 307a. As part of the test call, endpoint A 307a may send audio and/or video information to endpoint B 307b. Endpoint B 307b may verify receipt of the information and return the audio and/or video information. For example, endpoint A 307a may use a tone generator to test audio transmission and reception over the tested network path for a range of frequencies. Endpoint B 307b may also have other-audio and/or video information to send to endpoint A 307a. The test call may also test various network characteristics including bandwidth and packet loss. Other network characteristics/protocols (e.g., audio path characteristics, video path characteristics, bandwidths, packet loss, and jitter) may be tested. In some embodiments, the current network characteristics as determined in the test call may be compared to predetermined criteria (e.g., necessary conditions (e.g., protocols) for conducting the call as determined by a network administrator). The current network characteristics may also be compared to predicted network conditions. If the current network characteristics do not meet the predetermined criteria or if the system in some other way determines that the current characteristics are not ideal for the call, a failure may be indicated.

In some embodiments, the test call between endpoint A 307a and endpoint B 307b may include instructions to the one or more of the endpoints to not ring or notify a user (i.e., the test call, may remain invisible to an end user). The test call may also include instructions to one or more endpoints to not wake up (if asleep) and/or to not activate any attached components (e.g., attached cameras, personal computers, etc.) if the components are not active. In some embodiments, the instructions for the test call may be stored locally on one or more of the endpoints 307.

In some embodiments, the management system may include software either residing on a device (e.g., an audio device, a video conferencing endpoint, and/or teleconferencing devices such as cell phones) or externally to the device connected by a network that provides facilities to schedule software based on the known (and/or discoverable) topology of the network. In some embodiments, the management system may be resident on a multipoint control unit (MCU). The software may be separate from the conferencing device and may be capable of making decisions based on information gathered from the device and other devices on the network. In another embodiment, the management system may include embedded software that is resident on the device and may be dedicated to operation of that device.

Figure 4:
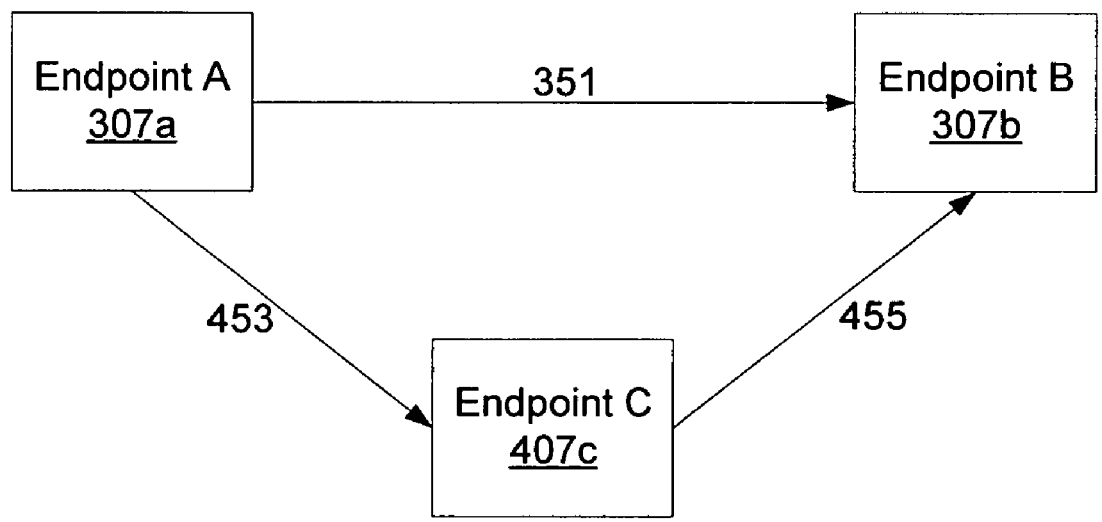
FIG. 4 illustrates a test call for an alternate network path between three endpoints, according to an embodiment.

FIG. 4 illustrates an embodiment test call between two endpoints including an alternate network path. If endpoint A 307a has a conference call scheduled with endpoint B 307b, the endpoint A 307a may attempt a test call with endpoint B 307b over network path 351. If network path 351 fails (for example, does not meet predetermined criteria) the endpoint A 307a may try an alternate network path (e.g., network path 453 to endpoint C 407c and then through network path 455 to endpoint B 307b). If the alternate network path is verified, the alternate network path may be used for the call between endpoint A 307a and endpoint B 307b. If the alternate network path also fails, then an administrator may be notified and/or the scheduled conference call between endpoint A 307a and endpoint B 307b may be rescheduled. In some embodiments, if the network paths fail for not meeting predetermined criteria, the system and/or network administrator may determine and use the best network path available for the call (even if the network path does not meet predetermined criteria). For example, various rules may be used to evaluate which network path is preferred under the current conditions. A warning may be sent to the participants that the call may fail and/or experience problems.

Figure 5:
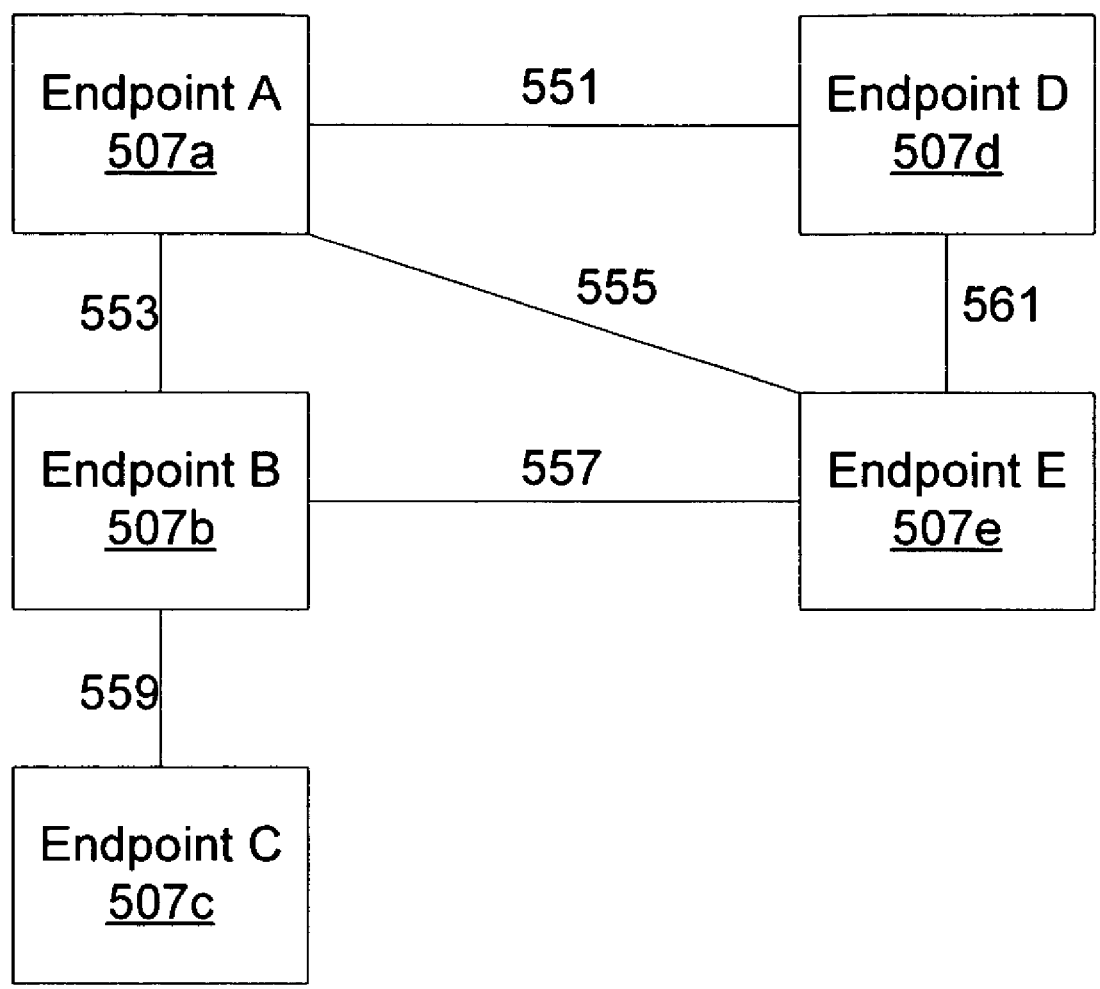
FIG. 5 illustrates multiple test calls between multiple endpoints, according to an embodiment.

FIG. 5 illustrates an embodiment of multiple test calls between multiple endpoints. If a conference call is scheduled between endpoint A 507*a*, endpoint B 507*b*, endpoint C 507*c*, and endpoint E 507*e*, network links between these endpoints may be tested prior to the call. For example, endpoint B 507*b* may test call endpoint A 507*a* through network link 553, test call endpoint C 507*c* through network link 559, and test call endpoint E 507*e* through network link 557. If a network link fails (and/or, for example, does not meet predetermined criteria), another network link may be tested (e.g., if network link 553 fails, network link 557 to endpoint E 507*e* and network link 555 between endpoint E 507*e* and endpoint A 507*a* may be used). If the alternate network path works, the alternate path may be used for the scheduled conference call. If the alternate network path fails, another network path may be tested (e.g., network link 557 to endpoint E 507*e*, network link 561 to endpoint D 507*d*, and network link 551 to endpoint A 507*a*). When an alternate network path is successfully verified, that path may be used in the scheduled conference call. In some embodiments, an administrator may be notified whenever a network path fails and may be presented with alternate network paths. If an alternate network path is not found, the conference call may be rescheduled (or the best current network path may be used). The administrator may also be provided with the option of rescheduling the conference call or choosing an alternate network path with any network path failure.

In some embodiments, a network path may be valid, but not preferable. For example, in the call described above, if endpoint B 507*b* is scheduled to be the bridging point between endpoint A 507*a*, endpoint C 507*c*, and endpoint E 507*e*, but does not have sufficient bandwidth to handle the call, another bridging point (or an additional bridging point) may be selected (e.g., endpoint E 507*e* may be used to bridge communications to endpoint B 507*b* and endpoint A 507*a*). In some embodiments, the tested endpoint may report to the management system or directly to a scheduling agent (e.g., a call participant) if the test call indicates current network characteristics do not meet the predetermined criteria set for successful completion of the scheduled call. Other end users may also be alerted that there is a problem with the call. The call may then be rescheduled or rerouted.

Other methods of verifying the network path besides a test call may also be used. For example, inputs from real time network monitors may allow a management system to make decisions based on real time traffic flow outside the video conferencing systems knowledge. Prioritization of traffic based on Quality of Service (QoS) or shaping of traffic can be adjusted based on importance of calls. Alerting and auto problem rectification can be integrated into network management systems (e.g., larger scale network management systems) that can auto re-route traffic based on inputs from the process.

In some embodiments, network paths may be tested at speeds and resolutions requested by call participants, but should the call not be possible at the requested speed and/or resolution, the network paths may be tested at slower speeds and lower resolutions to see if a lower rate/lower resolution call is possible. Other characteristics may also be tested. For example, once the test call is established, each endpoint may report to the initiating endpoints whether video and audio are being received from all connected endpoints. The tested endpoints may also report on packet loss, jitter and other call related statistics. These characteristics may also be used, for example, by a management system, to determine the best network path to use for the call.

Figure 6:
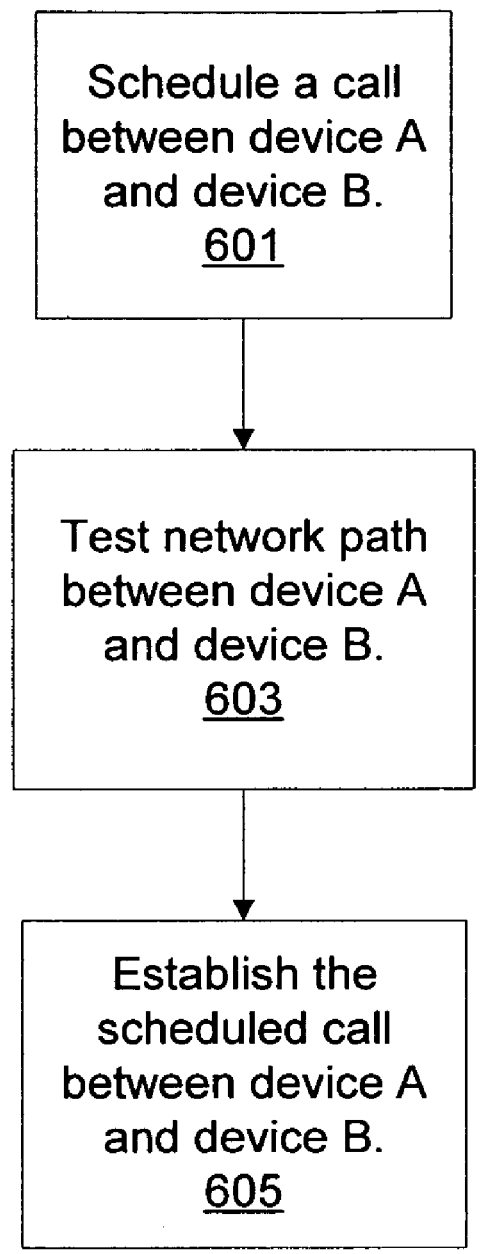
FIG. 6 illustrates a flowchart for verifying a network path using a test call, according to an embodiment.

FIG. 6 illustrates a flowchart for verifying a network path using a test call, according to an embodiment. It should be noted that in various embodiments of the methods described below, one or more of the elements described may be performed concurrently, in a different order than shown, or may be omitted entirely. Other additional elements may also be performed as desired.

At 601, a call may be scheduled between device A and device B (e.g., endpoint A and endpoint B).

At 603, a network path between device A and device B may be tested. The test may be scheduled for a preset time prior to the scheduled call. Multiple tests may be performed prior to the scheduled call (e.g., a test 2 hours before the call and again 30 minutes before the call). More tests may be scheduled prior to the call according to the severity of the call. For example, if the call involves a board meeting and/or several executives, a test may be performed every 15 minutes prior to the call, but if the call involves a lower level meeting (e.g., a routine engineer meeting), fewer tests may be scheduled. Other testing intervals may also be used. The intervals may be programmed into the system and/or may be determined by an administrator (e.g., based on the severity of the scheduled call). If other calls are occurring (or scheduled) between endpoints to be tested, the testing may be scheduled to occur between calls.

At 605, the scheduled call may be established between device A and device B.

Figure 7:
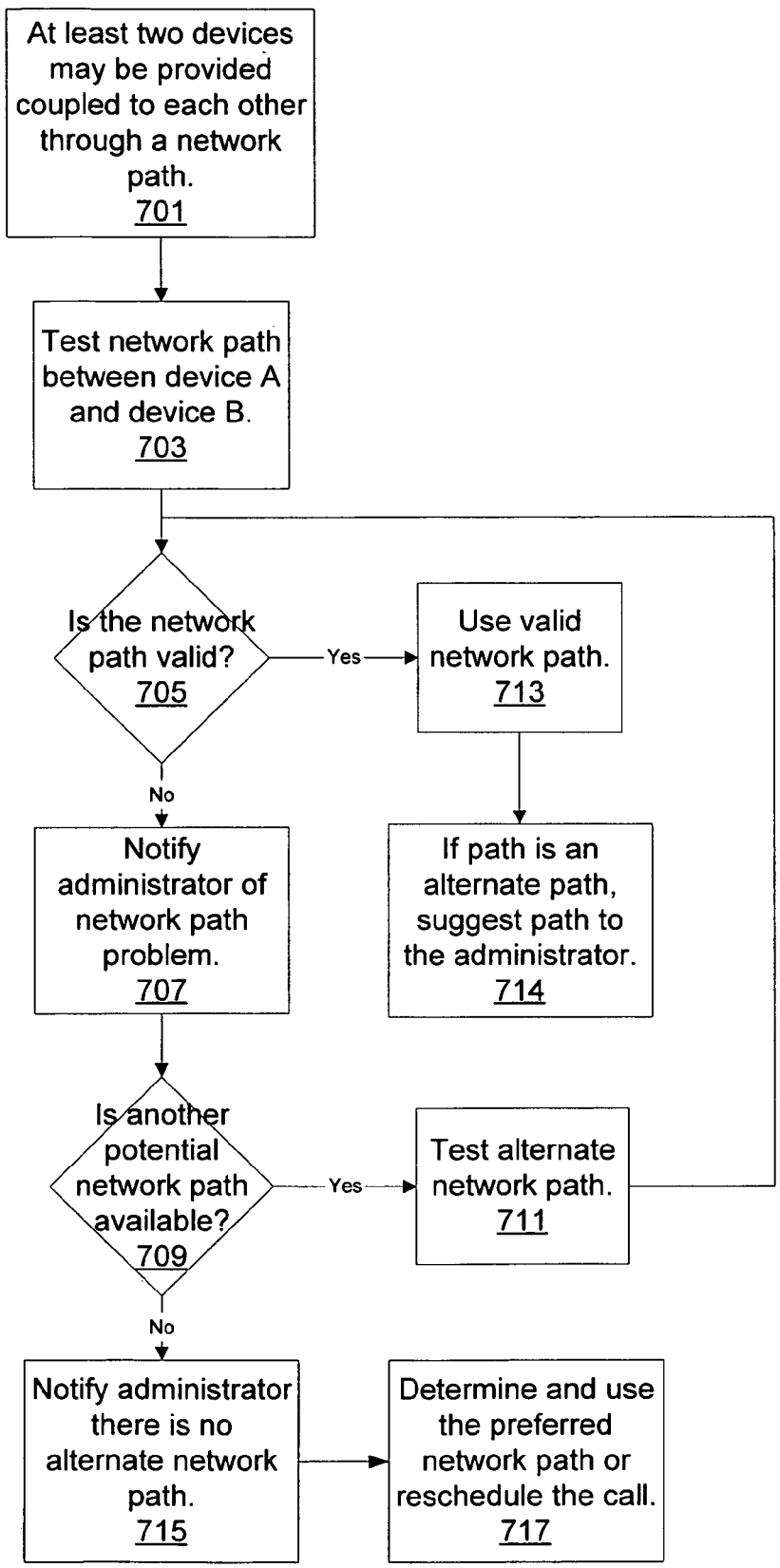
FIG. 7 illustrates a flowchart for testing alternate network paths, according to an embodiment.

FIG. 7 illustrates a flowchart for testing alternate network paths, according to an embodiment. It should be noted that in various embodiments of the methods described below, one or more of the elements described may be performed concurrently, in a different order than shown, or may be omitted entirely. Other additional elements may also be performed as desired.

At 701, at least two devices may be provided coupled to each other through a network path (e.g., a communications path).

At 703, a network path may be tested between device A and device B (e.g., using protocols needed to conduct a future call between the at least two devices). For example, audio and video capabilities of the network between the two devices may be tested using similar protocols as will be used during a call (e.g., a similar protocol may include sending the data at a predetermined bandwidth).

At 705, a decision may be made whether the network path is valid.

At 707, if the network path is not valid, an administrator may be notified. The administrator may try to troubleshoot the problem using a variety of methods. For example, the administrator may contact a participant at a remote site to determine if call system components are connected correctly. The administrator may also run additional diagnostics on the network to find and fix the problem. Other solutions are also contemplated. In some embodiments, the test call may be able to determine where in the network the problem exists. This may assist the administrator in solving the problem.

At 709, a decision may be made whether there is another potential network path available. Other potential network paths may include transmitting over the same network path, but with a different protocols.

At 715, if there is not another network path available, the administrator may be notified that there is no alternate network path.

At 717, the preferred network path may be determined and used or the call may be rescheduled. For example, if multiple network paths do not meet predetermined criteria, the best network path may be determined and used. If it is determined that even the best available network path will not support the call (or, for example, the quality of the call will be too low) the call may be rescheduled.

At 711, if there is another potential network path, the alternate network path may be tested. Return to 705. In some embodiments, alternate network paths may be tested in advance. For example, during the pre call testing, the management system may be aware of network topology and capabilities of the endpoints and may send instructions to test additional network paths so alternative methods of making the call are tested in case the primary method fails or is incapable of making the scheduled call.

At 713, if the network path is valid (decision 705), then the valid network path may be used (e.g., in a scheduled call). At 714, if the valid network path is a tested alternate network path, the alternate network path may be suggested to the administrator or user (e.g., by the management system). In some embodiments, the alternate network path may be suggested to the administrator prior to or in place of testing the alternate network path.

Figure 8:
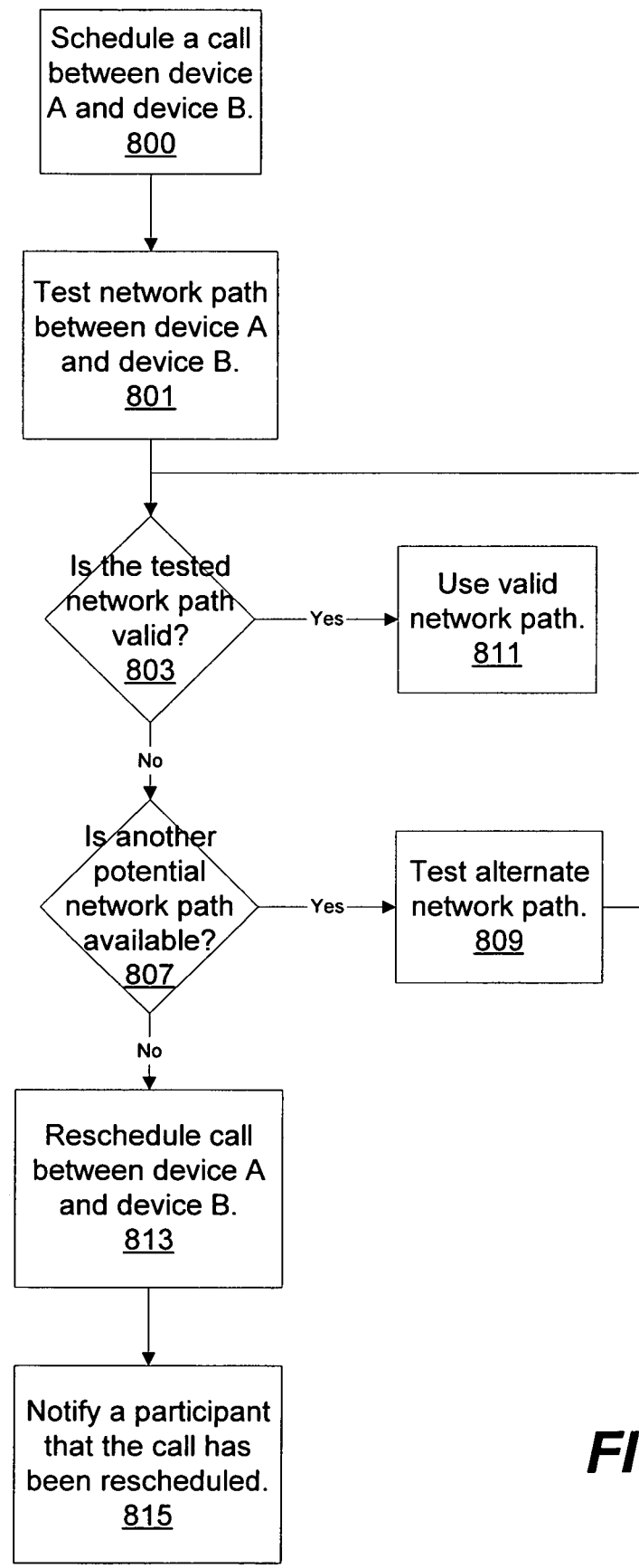
FIG. 8 illustrates rescheduling a call in response to a failed network path, according to an embodiment.

FIG. 8 illustrates rescheduling a call in response to a failed network path, according to an embodiment. It should be noted that in various embodiments of the methods described below, one or more of the elements described may be performed concurrently, in a different order than shown, or may be omitted entirely. Other additional elements may also be performed as desired.

At 800, a call may be scheduled between device A and device B. The call may be scheduled, for example, using third party software such as Microsoft Outlook. This can be through a management system or through the endpoints directly.

At 801, the network path between device A and device B may be tested (e.g., using at least one protocol (such as bandwidth) needed to conduct a call between the two devices). In some embodiments, a primary network path may include an original path predetermined by an endpoint or management system to use for the scheduled call.

At 803, a decision may be made whether the tested network path is valid.

At 811, if the tested network path is valid, the valid network path may be used.

At 807, if the tested network path is not valid, a decision may be made whether another potential network path is available. In some embodiments, a participant and/or administrator may be notified of the failed network path.

At 809, if there is another potential network path, the alternate network path may be tested (return to 803). If the alternate network path works, the system may change the booking arrangements to use the videoconferencing endpoints and network paths that are available and functioning correctly, and update participants of the change in plans for the conference (e.g., by sending out email alerts to each of the participants regarding the schedule change).

At 813, if there another potential network path is not available, the call between device A and device B may be rescheduled.

At 815, a participant of the scheduled call may be notified that the call has been rescheduled.

In determining predetermined criteria, alternate network paths, and/or rescheduling calls, Deducible Capability Numbering (DCN) (as described in U.S. patent application Ser. No. 11/119,601 which is incorporated by reference herein) may be used. For example, the DCN numbers may describe the capabilities of connection devices on the network using a series of representative numbers. The DCN may be used in determining the protocols for the calls (and to be used in the test calls). These representative numbers may be stored, be accessible, and/or be updated by the management system and/or other connected devices. The DCN may be used to find primary as well as alternate network paths for a call. The DCNs may be used to determined if current network path conditions meet the expected conditions. The DCNs may be also used to reschedule calls.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus, Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method, comprising:
   determining a network path between at least two videoconference devices, including a first videoconference device and a second videoconference device;
   at a first time, automatically testing the network path between the at least two videoconference devices using a protocol to be used in conducting a future videoconference between the at least two videoconference devices, wherein the protocol is determined according to deducible capability numbering (DCN) assigned to at least one of the at least two videoconference devices, wherein said automatically testing the network path comprises the first videoconference device automatically calling the second videoconference device without receiving user input to perform said testing, wherein during said testing the network path at the first time, a first connection is established between the at least two videoconference devices;
   at a later time, performing the videoconference based on said testing the network path, wherein during said performing the videoconference at the later time, a second connection is established between the at least two videoconference devices, wherein the second connection is different than the first connection.

2. The method of claim 1, wherein the protocol is associated with audio and video communication.

3. The method of claim 1, wherein said testing is performed without notifying an end user.

4. The method of claim 1, wherein said testing is performed at predetermined time intervals.

5. The method of claim 4, wherein shorter predetermined time intervals are used prior to scheduled calls with a higher importance level.

6. The method of claim 1, further comprising testing at least one alternate network path between the at least two devices.

7. The method of claim 1, further comprising notifying an administrator if a problem is detected during the testing of the network path.

8. The method of claim 7, further comprising suggesting an alternate network path to the administrator if a problem is detected while testing the network path between the at least two videoconference devices.

9. The method of claim 1, further comprising:
   testing at least one alternate network path between the at least two videoconference devices;
   wherein a preferred network path of the tested network paths may be determined and used for the future videoconference.

10. The method of claim 1, wherein said testing the network path using at least one protocol includes testing at least one of an audio path characteristic, video path characteristic, bandwidth, packet loss, or jitter.

11. The method of claim 1, further comprising:
    scheduling the future videoconference prior to said testing the network path between the at least two devices; and
    rescheduling the future videoconference if a problem is detected during testing of the network path.

12. The method of claim 1, wherein said testing the network path comprises the first videoconference device transmitting audio or video information to the second videoconference device, wherein, in response, the second videoconference device then transmits the audio or video information back to the first videoconference device.

13. A non-transitory, computer accessible memory medium storing program instructions, wherein the program instructions are executable by a processor to:
    at a first time, automatically test a network path between at least two videoconference devices using a protocol to be used in conducting a future videoconference between the at least two videoconference devices, wherein the protocol is determined according to deducible capability numbering (DCN) assigned to at least one of the at least two videoconference devices, wherein testing the network path between the at least two devices comprises a first videoconference device automatically calling a second videoconference device without receiving user input to perform said testing, wherein during testing the network path at the first time, a first connection is established between the at least two videoconference devices;
    wherein at a later time after said automatically testing, the first and second videoconference devices are configured to participate in the videoconference over the network path using a second connection.

14. The non-transitory, computer accessible memory medium of claim 13, wherein the protocol is associated with audio and video communication.

15. The non-transitory, computer accessible memory medium of claim 13, wherein said testing is performed at predetermined time intervals.

16. The non-transitory, computer accessible memory medium of claim 13, wherein the program instructions are further executable to:
    test at least one alternate network path between the at least two devices.

17. The non-transitory, computer accessible memory medium of claim 13, wherein the program instructions are further executable to:
    notify an administrator if a problem is detected during the testing of the network path.

18. The non-transitory, computer accessible memory medium of claim 13, wherein said testing the network path using at least one protocol includes testing at least one of an audio path characteristic, video path characteristic, bandwidth, packet loss, or jitter.

19. The non-transitory, computer accessible memory medium of claim 13, wherein the program instructions are further executable to:
    schedule the future videoconference prior to said testing the network path between the at least two devices; and
    reschedule the future videoconference if a problem is detected during testing of the network path.

20. The non-transitory, computer accessible memory medium of claim 13, wherein said testing the network path comprises the first videoconference device transmitting audio or video information to the second videoconference device, wherein, in response, the second videoconference device then transmits the audio or video information back to the first videoconference device.

* * * * *

UNITED STATES PATENT AND TRADEMARK OFFICE
CERTIFICATE OF CORRECTION

| | | |
|---|---|---|
| PATENT NO. | : 8,149,739 B2 | Page 1 of 1 |
| APPLICATION NO. | : 11/404582 | |
| DATED | : April 3, 2012 | |
| INVENTOR(S) | : Kenoyer et al. | |

It is certified that error appears in the above-identified patent and that said Letters Patent is hereby corrected as shown below:

Title Page:

(60) please delete "Provisional application No. 60/619,210, filed on Oct. 15, 2004." and insert -- Provisional application No. 60/619,210, filed on Oct. 15, 2004; Provisional application No. 60/676,918, filed on May 2, 2005. --

Signed and Sealed this
Nineteenth Day of June, 2012

David J. Kappos
*Director of the United States Patent and Trademark Office*